United States Patent [19]
Fukumoto et al.

[11] Patent Number: 5,394,381
[45] Date of Patent: Feb. 28, 1995

[54] OPTICAL PICKUP APPARATUS AND MAGNETO-OPTICAL REPRODUCING SYSTEM

[75] Inventors: Atsushi Fukumoto; Michio Oka, both of Kanagawa, Japan

[73] Assignee: Sony Corporation, Tokyo, Japan

[21] Appl. No.: 259,934

[22] Filed: Jun. 13, 1994

Related U.S. Application Data

[63] Continuation of Ser. No. 720,830, filed as PCT/JP90/01492, Nov. 15, 1990, published as WO 91/07749, May 30, 1991, abandoned.

[30] Foreign Application Priority Data

Nov. 16, 1989 [JP] Japan ................................. 1-298615

[51] Int. Cl.$^6$ ............................................. G11B 13/04
[52] U.S. Cl. ........................................ 369/13; 360/114
[58] Field of Search .................... 369/13; 360/114, 59

[56] References Cited

U.S. PATENT DOCUMENTS

| | | | |
|---|---|---|---|
| 5,043,960 | 8/1991 | Nakao et al. | 360/114 |
| 5,084,851 | 1/1992 | Noda et al. | 369/44.42 |
| 5,093,822 | 3/1992 | Kugiya et al. | 369/121 |

FOREIGN PATENT DOCUMENTS

| | | |
|---|---|---|
| 229035 | 7/1987 | European Pat. Off. . |
| 312652 | 4/1989 | European Pat. Off. . |

OTHER PUBLICATIONS

Jenkins et al., "Interference of polarized light", Fundamentals of Optics, textbook, third edition, McGraw-Hill Book Company, Inc., 1957, pp. 554–557.

*Primary Examiner*—Hoa T. Nguyen
*Attorney, Agent, or Firm*—Jay H. Maioli

[57] ABSTRACT

An optical pickup apparatus of the present invention for reading out information signals recorded on an optical recording medium such as magneto-optical disc is adapted to split by means of a light splitting element a light beam emitted from a light source into two light beam travelling in different directions, which are linearly polarized in normally intersecting directions and to convert the phases of the vibrational components along normally intersecting two axes on a plane normally intersecting the traveling directions of the two light beams and to irradiate the recording medium with two light beams which are differently polarized so that two beam spots are partially superimposed with each other on the recording medium. The superimposed beam spot area which is a read out area is made smaller than one of the beam spots in size so that a high resolution read-out is performed.

4 Claims, 3 Drawing Sheets

OPTICAL PICKUP APPARATUS AND MAGNETO-OPTICAL REPRODUCING SYSTEM

This is a continuation of application Ser. No. 07/720,830, filed as PCT/JP90/01492, Nov. 15, 1990, published as WO 91/07749, May 30, 1991, now abandoned.

TECHNICAL FIELD OF ART

The present invention relates to an optical pickup apparatus used for reading out information signals recorded on an optical recording medium such as a magneto-optical disc and a magneto-optical reproducing system using the optical pickup apparatus.

BACKGROUND ART

Optical recording media a which are designed to record information signals thereon by changing the magnetization direction of a perpendicularly magnetizable film in a recording layer and by optically reading out the recorded information signal s as is done similarly to magneto-optical disc have heretofore been proposed.

Such an optical pickup apparatus for reading out information signals recorded on an optical recording medium converges a linearly polarized light beam through an objective lens to irradiate the signal recording surface of the optical recording medium with the converged light beam and to detect changes in direction of the linear polarization of a returning light reflected by the optical recording medium by means of a photodetector. That is, the returning light f tom the optical recording medium has changed the polarization direction due to Kerr effect depending upon the magnetization direction at an area which is irradiated with the light beam. The differences of the magnetization direction of the optical recording medium are detected by detecting the changes in polarization direction of the returning light by detecting means such as a photodetector disposed in the optical pickup apparatus for detecting the strength of light, for example, through a beam splitter having a polarization dependence. In the magneto-optical reproducing system using the optical pickup apparatus, reproducing of international signals recorded on the optical recording medium is performed based upon the difference of the detected magnetization directions.

The magneto-optical disc is formed in such a manner that information signals are recorded by successively disposing recording pits on a recording track formed in a circumferential direction of the disc. The recording density of the information signals of such kind of magneto-optical disc is determined by the recording line density which is the recording density of recording pits successively arranged on the recording track and the recording track density which is the pitch between recording tracks adjacent in a radial direction of the disc. The recording line density and the recording track density which determine the recording density of the information signals in the magneto-optical disc is restricted by the cut-off frequency $f_c$ by the optical pickup apparatus which reads the information signals from the magneto-optical disc. For example, if the spatial frequency of the changes in magnetization direction of the recording pits successively arranged on the recording track becomes higher than the cut-off frequency $f_c$, read out of the information signals from the returning light becomes impossible. If the spatial frequency corresponding to the pitch between the recording tracks adjacent in a radial direction of the disc becomes higher than the cut-off frequency $f_c$, so-called cross-talk in which information signals are read out from the adjacent recording track will occur.

The cut-off frequency of the optical pickup apparatus is determined by the numerical aperture NA of an objective lens forming the optical pickup apparatus and the wave length λ of the light beam emitted from the optical pickup apparatus. The diameter, that is, the size of the beam spot of the light beam converged upon the signal recording surface of the magneto-optical disc is determined by the numerical aperture NA of the objective lens and the wave length λ of the light beam. From these relations, the cut-off frequency $f_c$ of the optical pickup apparatus will be increased as the diameter of the beam spot of the light beam converged upon the optical recording medium is decreased. The cut-off frequency $f_c$ has a relation with the numerical number NA and the wave length λ of the light beam represented by a first formula as follows:

$$f_c = 2NA/\lambda \qquad (1)$$

In an optical pickup apparatus in which the numerical aperture NA of the objective lens is 0.5, and the wave length λ of the light beam emitted from the optical source is 0.78 μm in the formula 1, read out of the information signals recording at a spatial frequency up to 1280 lines/mm is possible. Read out of the information signals recorded at higher frequency is not possible. From the formula 1, it will suffice to increase the numerical number NA of the objective lens or to decrease the wave length λ of the light beam in order to increase the cut-off frequency $f_c$ of the optical pickup apparatus. The recording density of the magneto-optical disc which can be readable by the optical pickup apparatus can be enhanced by increasing the cut-off frequency $f_c$.

However, if the numerical aperture of the objective lens is increased, for example, compensation for aberration cannot be sufficiently achieved and it becomes impossible to design and manufacture a lens having excellent performances. Shortening the wave length of a light beam emitted from a semiconductor laser element commonly used as a light source makes it impossible to design and manufacture the semiconductor laser element since light having a shorter wave length has a higher energy of light.

Therefore, the present invention is proposed in view of the above-mentioned circumstances.

It is an object of the present invention to provide an optical pickup apparatus which is capable of reading out information signals recorded at a high recording density having a spatial frequency higher than a cut-off frequency determined by the numerical aperture of an objective lens and the wave length of a light beam without increasing the numerical aperture and the wave length.

It is another object of the present invention to provide a magneto-optical reproducing system which enables an optical information disc on which information signals are recorded at a high recording density to be used as a recording medium.

DISCLOSURE OF THE INVENTION

An optical pickup apparatus of the present invention comprises a light source for emitting a light beam; light beam splitting means for splitting said light beam into different two light beams which are linearly polarized in directions intersecting with each other at a normal angle; and a phase converting element into which the two light beams split by said light splitting means are impinged for converting the phase of the vibrational components along two axes normally intersecting the travelling direction of the incident light beams; whereby a recording medium is irradiated with two light beams having different polarizations which are partially superimposed on with each other.

A magneto-optical reproducing system of the present invention uses the optical pickup apparatus.

In the optical pickup apparatus of the present invention, two beams which are differently, polarized are impinged upon an optical recording medium so that the beam spots on the medium are partially superimposed on with each other. Accordingly, areas which are irradiated with three kinds of polarized light beams are formed on the optical recording medium. The area which is irradiated with a light beam having a polarization state involving in reading out of informational signal among three kinds of polarized light beam is smaller than one of beam spots.

PREFERRED EMBODIMENT OF THE PRESENT INVENTION

Now, embodiments of the present invention will be described in detail with the reference to the drawings.

Figure 1:
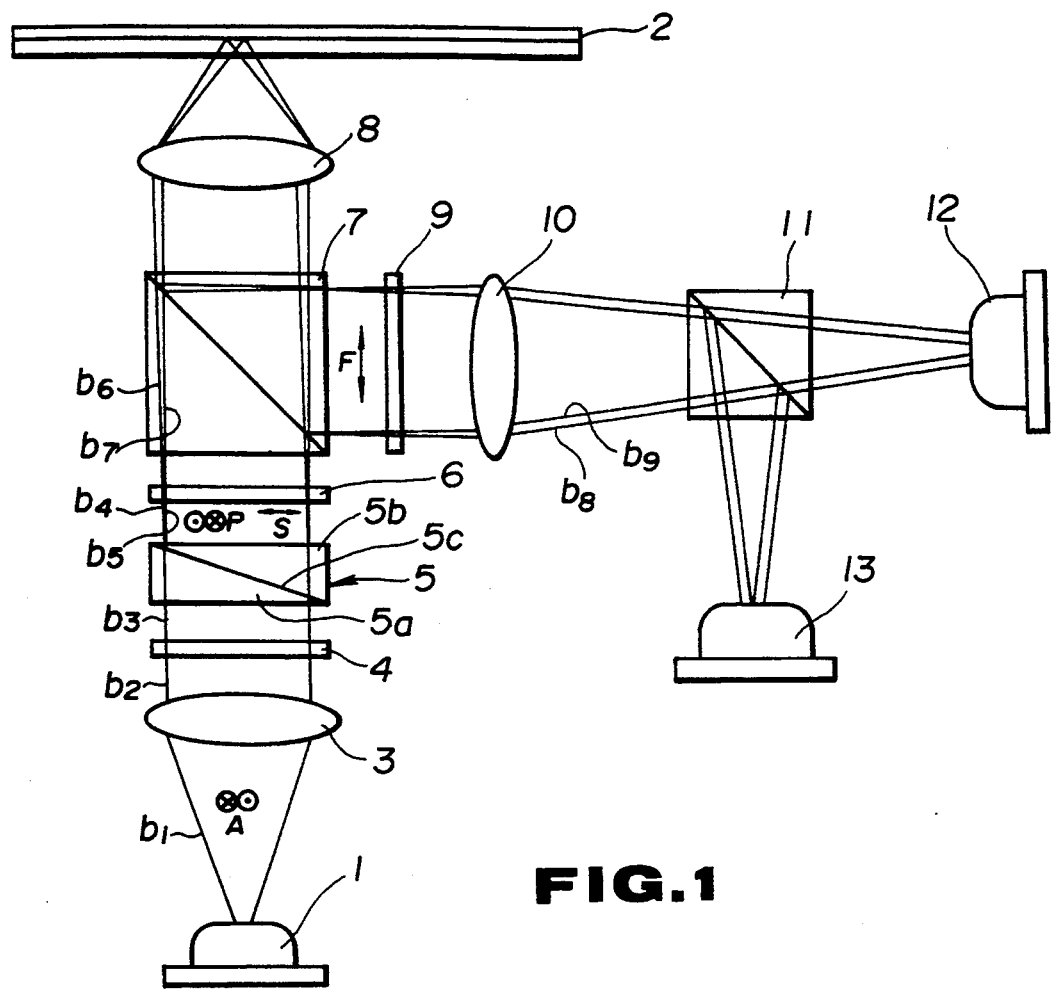
FIG. 1 is an elevational view schematically showing the structure of an optical pickup apparatus of the present invention.

An optical pickup apparatus of the present invention has a semiconductor laser element 1 which serves as an optical source as shown in FIG. 1. The apparatus is designed so that an optical beam emitted from the semiconductor laser element 1 is impinged upon a magneto-optical disc 2 an optical recording medium via a predetermined optical device.

Figure 2:
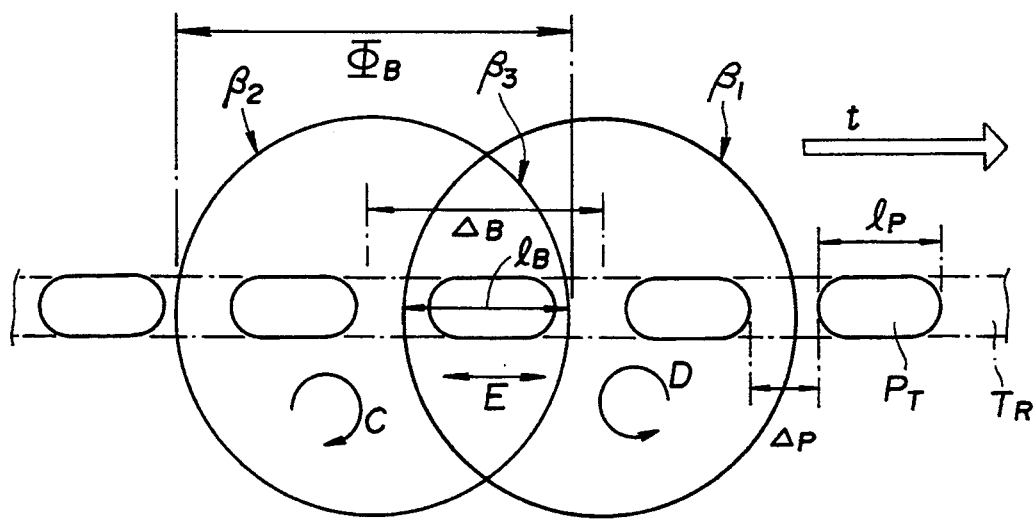
FIG. 2 is an enlarged plan view schematically showing the condition of beams spots formed on an optical recording medium by the optical pickup apparatus.

The light beam $b_1$ emitted from the semiconductor laser element 1 is a light beam having a coherent phase and is polarized in one direction shown by an arrow A in FIG. 1 perpendicular to the travelling direction. In FIG. 2, the arrow A is represented in a direction perpendicular to the plane of the drawings.

The light beam $b_1$ is converted into a parallel light beam $b_2$ through a collimator lens 3 and is impinged upon a first rotatory polarizer 4. The first rotary polarizer 4 is formed of, for example, a half wave length plate. The parallel light beam $b_2$ is converted into a light beam $b_3$ having a polarized direction rotated by 45° by having been transmitted through the first rotary polarizer 4.

The light beam $b_3$ is impinged upon a Wollaston prism 5 which serves as a light splitting element. The Wollaston prism 5 is adapted to split the incident light beam $b_3$ into two light beams $b_4$ and $b_5$ having the same quantity of light, which have travelling directions which form a given angle $\theta$. The two light beams $b_4$ and $b_5$ which are split by the Wollaston prism 5 are linearly polarized in directions which intersect with each other at a normal angle as shown by arrows P and S in FIG. 1.

The Wollaston prism 5 comprises two prisms 5a and 5b made of a material having a given crystalline structure which exhibits birefringence. The two prisms 5a and 5b are disposed in such a manner that the crystalline axes intersect with each other at a normal angle and the prisms are bonded with each other at a bonding interface 5c having a given inclination angle relative to the traveling direction of the incident light beam. The manner of the changes in the refraction index of the light beam $b_3$ incident on the Wollaston prism 5 and having a polarized component P before and after passing through the bonding interface 5c is reversed relative to polarized component S. Directions of refraction of the polarized components P and S at the bonding interface 5c are opposite so that the incident light beam is split at the bonding interface 5c. The quantities of the light beams $b_4$ and $b_5$ split by the Wollaston prism 5 can be adjusted so that they become equal by rotating the first rotary polarizer 4 around its optical axis.

The arrow P represents the same direction as that represented by the arrow A in FIG. 1.

The two light beams $b_4$ and $b_5$ split by the Wollaston prism 5 are incident upon a quarter-wavelength plate 6 serving as a phase converting element. The quarter-wavelength plate 6 is disposed in such manner that the incident light beams $b_4$ and $b_5$ converted into light beams $b_6$ and $b_7$, respectively which are circularly polarized in opposite rotational directions by converting the phase of the vibrational components along two axes normally intersecting with each other on a plane which intersects the travelling direction of the incident light beams $b_4$ and $b_5$ at a normal angle. In order words, the quarter-wavelength plate 6 is disposed so that the direction of the crystal axis of prism 5 and the polarization direction of each light beam $b_4$ and $b_5$ make an angle of 45°.

The two light beams $b_6$ and $b_7$ which have been transmitted through the quarter-wavelength plate 6 and are circularly polarized in opposite rotation directions will be transmitted through the beam splitter 7 and be converged upon disc 2 by an objective lens 8. That is, two beam spots $\beta_1$ and $\beta_2$ each having a given diameter $\Phi_B$ and center spacing represented by an arrow $\Delta_B$ in FIG. 2, which are circularly polarized in opposite rotational directions shown by arrows C and D in FIG. 2 are formed on the disc 2 as shown in FIG. 2.

Since the spacing $\Delta_B$ between the centers of the beam spots $\beta_1$ and $\beta_2$ which is shown by an arrow $\Delta_B$ is represented by a formula $\Delta_B = f \cdot \theta$ wherein f represents the focal length of the objective lens 8, and $\theta$ represents an angle between the travelling directions of the two light beams $b_4$ and $b_5$ split by the Wollaston prism 5, the spacing $\Delta_B$ can be desiredly preset by changing the focal length f and the angle $\Theta$. The spacing $\Delta_B$ is made shorter than the diameter $\Phi_B$ of the beam spots $\beta_1$ and $\beta_2$ so that the two beam spots $\beta_1$ and $\beta_2$ are partially superimposed with each other on the disc 2. The light beams $b_6$ and $b_7$ which are incident upon a superimposed area $\beta_3$ in which the beam spots $\beta_1$ and $\beta_2$ are superimposed on with each other interfere with each other since the light beams $b_6$ and $b_7$ are coherent. The light beams on the superimposed area $\beta_3$ are linearly polarized in a direction connecting between the centers of the beam spots $\beta_1$ and $\beta_2$. The length $l_B$ of the superimposed area $\beta_3$ in a direction connecting between the centers of the beam spots $\beta_1$ and $\beta_2$ represented by an arrow $l_B$ can be represented by a formula:

$$l_B = \Phi_B - \Delta_B.$$

Thus, the length $l_B$ is made shorter than the diameter $\Phi_B$ of the beam spots $\beta_1$ and $\beta_2$ and can be desiredly preset by changing the spacing $\Delta_B$.

A recording track $T_R$ is formed on the disc 2. The recording track $T_R$ is formed from the inner peripheral side of the disc 2 to the outer peripheral side in a spiral manner so that successive circle lines are formed at a given pitch in a radial direction. A multiplicity of recording pits $P_T$ for recording information signals by the differences in the directions of perpendicular magnetization are formed on and along the recording track $T_R$ in a track direction represented by an arrow t.

When the linearly polarized light beam is incident upon each of the recording pits $P_T$, the polarization direction of the light beam is changed by the Kerr effect depending upon the direction of perpendicular magnetization of the irradiated recording pit $P_T$ and the light beam is reflected thereby. When the circularly polarized light beam is incident upon the recording pit $P_T$, the light beam is reflected thereby as it is circularly polarized without being influenced by the Kerr effect. The light beam reflected from the superposed area $\beta_3$ of returning light $b_8$ and $b_9$ which are light beams $b_B$ and $b_7$ reflected by the disc 2 are linearly polarized by the Kerr effect and returning light from the beam spots $\beta_1$ and $\beta_2$ other than the superimposed area $\beta_3$ are circularly polarized as they are after they are reflected.

The optical pickup apparatus is positioned relative to the disc 2 so that the direction connecting between the beam spots $\beta_1$ and $\beta_2$ is the direction of the recording track $T_R$. The recording pits $P_T$ each having a given pit length $l_P$ represented by an arrow $L_P$ in FIG. 2 at a given spacing $\Delta P$ represented by an arrow $\Delta P$ in FIG. 2 along the track.

The pit length $l_P$ is not always a constant for some recording format of information signals to be recorded and may be changed depending upon the content of the information signals. The minimum value rain $l_P$ of the pit length $l_P$ is determined so that the spatial frequency in the direction of the recording track $T_R$ will not exceed a cut-off frequency corresponding to the length $l_B$ of the superimposed portion $\beta_3$ in a direction connecting between the beam spots $\beta_1$ and $\beta_2$. As is similar to the pit length $l_P$, the pit spacing $\Delta P$ is not a constant for recording format of the information signals to be recorded and may be changed depending upon the content of the information signals. The minimum value rain $\Delta P$ of the pit spacing $\Delta P$ is determined so that the spatial frequency in the direction of the recording track $T_R$ will not exceed a cut-off frequency corresponding to the length $l_B$.

The returning light $b_8$ and $b_9$ from the disc 2 are made parallel via the objective lens 8 and are returned to the beam splitter 7. The returning lights $b_8$ and $b_9$ are reflected by the beam splitter 7 and are incident upon the second rotary polarizer 9. A half wave length plate is used as the second rotary polarizer 9.

Since the returning lights $b_8$ and $b_9$, reflected by the superimposed area $\beta_3$ are linearly polarized in a direction represented by an arrow F in FIG. 1, the direction of the polarization of the returning lights are rotated by 45° around the optical axis in the second rotary polarizer 9. Since the returning lights of the lights $b_8$ and $b_9$ reflected from the area outer than the superimposed area $\beta_3$ are circularly polarized, the polarization is not changed in the rotary polarizer 9.

The returning lights which have transmitted through the second rotary polarizer 9 are converged by a detection lens 10 and are incident upon a polarized light beam splitter 11. Since the returning lights of the returning $b_8$ and $b_9$ reflected from the superimposed area $\beta_3$ have the linearly polarization direction which has been rotated by 45° around the optical axis by the second rotary polarizer 9 in the polarized light beam splitter 11, substantially 50% of the lights are transmitted through the splitter 11 and are converged upon a photodetector 12 and the remaining 50% of lights are reflected by the splitter 11 and are condensed upon a section photodetector 13. The transmission and reflection factors of the returning light beams $b_8$ and $b_9$ in the beam splitter 11 reflected by the superimposed area $\beta_3$ are changed depending upon the changes in the direction of the linear polarization due to the Kerr effect. Since the returning lights of the returning lights $b_8$ and $b_9$ reflected from the area other than the superimposed area $\beta_3$ are circularly polarized, substantially 50% of the lights are constantly transmitted through the polarization beam splitter 11 and are converged upon the first photodetector 12 and the remaining 50% of the lights are reflected by the splitter 11 and converged upon the second photodetector 13.

The first and second photodetectors 12 and 13 each comprises, for example, a photo-transistor or photo-diode. The outputs of the photodetectors 12 and 13 are subtracted from each other to provide a read-out signal of an information signal recorded on the disc 2 by a so-called differential detection system. That is, only outputs corresponding to components of changes in the transmission and reflection factors in the polarization beam splitter 11 due to the Kerr effect are taken out and the unchanged components are canceled with each other to provide a zero signal.

As mentioned above, information signals having a spatial frequency higher than a cut-off frequency corresponding to the diameter $\Phi_B$ of each of the beam spots $\beta_1$ and $\beta_2$ which are recorded on the disc 2 can be read out in the optical pick up apparatus in accordance with the present invention.

The optical pickup apparatus is applied to a magneto-optical reproducing system and functions as an information detecting head of this reproducing system.

The light splitting element is not limited to only the above-mentioned Wollaston prism 5 and a device comprising a diffraction grating and rotary polarizer may be used. The optical pickup apparatus can be formed without using the rotary polarizer 4 if the semiconductor laser 1 is rotated by 45° relative to the track direction of the recording track $T_R$ around the optical axis. The optical pickup apparatus can be formed without using the second rotary polarizer 9 if the polarized beam splitter 11 and the photodetectors 12 and 13 are rotated by 45° around the optical axis.

Figure 3:
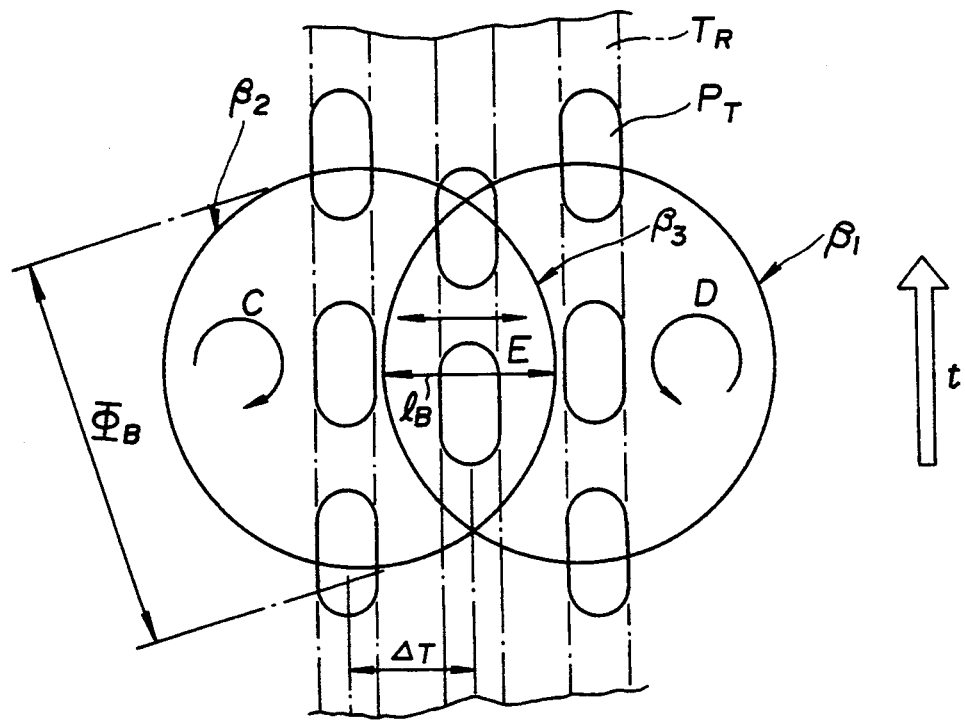
FIG. 3 is an enlarged plan view schematically showing the condition of beam spots formed on an optical recording medium in another usage example of an optical pickup apparatus of the present invention.

The optical pickup apparatus of the present invention which is formed as shown in FIG. 2 can be used by providing the beam spots $\beta_1$ and $\beta_2$ formed on the disc 2 in such a manner that the direction connecting between the beam spots $\beta_1$ and $\beta_2$ intersects the track direction of the recording track $T_R$ as shown in FIG. 3. In the thus arranged optical pickup apparatus, the track pitch $\Delta_T$ between recording track $T_R$ represented by an arrow $\Delta T$ in FIG. 3 is made to equal a spacing corresponding to a spatial frequency higher than a cut-off frequency corresponding to the diameter $\Phi_B$ of the beam spots $\beta_1$ and $\beta_2$ so that the recorded information signals are read out without causing so-called crosstalk.

Figure 4:
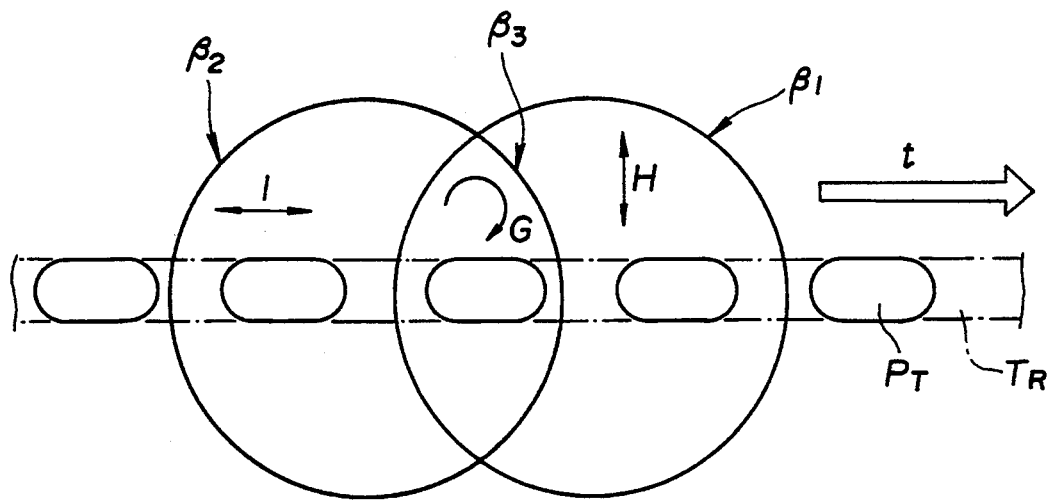
FIG. 4 is an enlarged plan view schematically showing the conditions of beam spots formed on an optical recording medium in other example of an optical pickup apparatus of the present invention.

If the two beam spots $\beta_1$ and $\beta_2$ are arranged in the track direction of the recording track $T_R$ as shown in FIGS. 1 and 2 and the quarter-wavelength plate 6 is rotated by substantially 45° around an optical axis in the optical pickup apparatus of the present invention, light beams impinged upon the superposed area $\beta_3$ as shown in FIG. 4 are circularly polarized in a direction as shown by an arrow G in FIG. 4. That is, in this case, the light beams which have passed through the Wollaston prism 5 are brought into an out-of-phase by 90° relationship with each other without changing the polarization direction by the quarter-wavelength plate 6. Therefore, the beam spots $\beta_1$ and $\beta_2$ are formed of linearly polarized light beams in directions represented by arrows I and H which intersect with each other and a circularly polarized light beam which is formed by the interference between these light beams is impinged upon the superimposed area $\beta_3$.

Figure 5:
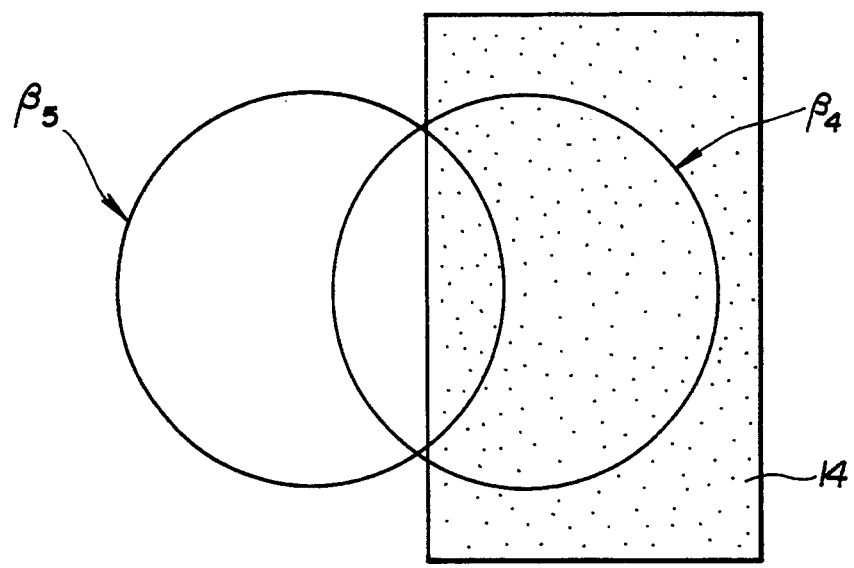
FIG. 5 is an enlarged front view schematically showing the structure of a photodetector constituting an optical pickup apparatus for forming the beam spots shown in FIG. 4.
Figure 6:
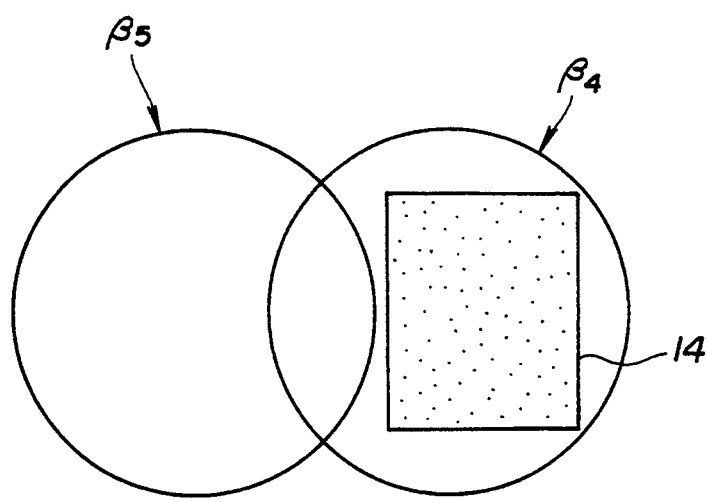
FIG. 6 is an enlarged front view schematically showing another example of the structure of a photodetector constituting an optical pickup apparatus for forming the beam spots shown in FIG. 4.

When the outputs of the first and second photodetectors 12 and 13 are differentially detected in the thus formed optical pickup apparatus, the component of a change due to the Kerr effect of the light beams reflected from a pair of areas other than the superimposed area $\beta_3$ of the beam spots $\beta_1$ and $\beta_2$ is detected. Each of the photodetectors in this case is formed so that it has a photo receiving face 14 for detecting the strength of light of only one of the light beams $\beta_4$ and $\beta_5$ reflected by a pair of areas other than the superimposed area $\beta_3$ of the beam spots $\beta_1$ and $\beta_2$ as shown in FIG. 5. The receiving face 14 may have an area smaller than the sectional area of either one of the light beams $\beta_4$ and $\beta_5$, the light strength of which is to be detected. If each of the photodetectors 12 and 13 has the photoreceiving face 14 having an area not less than about 40% of the sectional area of the light beam, the light strength of which is to be detected, it can sufficiently detect the strength of the light beam.

Also in the optical pickup apparatus, information signals having a spatial frequency higher than a cut-off frequency corresponding to the diameter $\Phi_B$ of the beam spots $\beta_1$ and $\beta_2$ which are recorded on the disc 2 can be read out similar to the optical pickup apparatus in which two beam spots $\beta_1$ and $\beta_2$ are arranged in a track direction of the recording track $T_R$ as shown in FIGS. 1 and 2.

A magneto-optical reproducing system using the optical pickup apparatus formed as mentioned-above enables a magneto-optical disc on which information signals are recorded at a spatial frequency higher than a cut-off frequency of the optical pickup apparatus to be used as a recording medium.

INDUSTRIAL APPLICABILITY

In the optical pickup apparatus of the present invention, two beams which are differently polarized are impinged upon an optical recording medium so that the beam spots on the medium are partially superimposed with each other.

Accordingly, areas which are irradiated with three kinds of polarized light beams are formed on the optical recording medium. The area which is irradiated with a light beam having a polarization state involving in reading out of informational signal among three kinds of polarized light beams is smaller than one of beam spots.

In the optical pickup apparatus, the spatial frequency of the readable information signals is equivalent to that of the case in which reading out of the information signals is achieved with a beam spot having a size equal to that of an area irradiated with a light beam having a polarization state involved in reading out of the information signals.

In other words, the present optical pickup apparatus enables reading out of information signals having a spatial frequency higher than a cut-off frequency determined by the numerical aperture of an objective lens and the wave length of a light beam, which are recorded at a high recording density without increasing the numerical aperture and the wave length.

The optical pickup apparatus is applied for a magneto-optical reproducing system and functions as a information detecting head for this reproducing system.

We claim:

1. An optical pickup apparatus, comprising:
   a light source for emitting a single light beam having a predetermined wavelength;
   light beam splitting means for splitting said single light beam into two different light beams each having said predetermined wavelength and being linearly polarized in polarization directions intersecting each other at a normal angle;
   a phase converting element upon which the two light beams split by said light splitting means are impinged for converting the phase of linearly polarized light waves of each of the two light beams incident thereon and producing two light beams that are circularly polarized in opposite rotational directions; and
   means for irradiating a recording medium with the two light beams that are circularly polarized in opposite rotational directions, so that the two light beams are partially superimposed with each other on the recording medium and an overlapping area of the two partially superimposed light beams is linearly polarized.

2. A magneto-optical reproducing system, comprising:
   an optical pickup apparatus for reading information recorded on a magneto-optical recording medium; said optical pickup comprising:
   means for producing two light beams that are polarized in opposite rotational directions and for irradiating said recording medium with said two light beams;
   means for partially superimposing said two light beams polarized in opposite directions with each other on said recording medium;
   photodetecting means for detecting a light beam returning from a partially superimposed area resulting from said partially superimposing said two light beams.

3. A magneto-optical reproducing system as defined in claim 2, wherein said means for producing two light beams comprises:

a light source for emitting a light beam having a predetermined wavelength;

light beam splitting means for splitting said light beam into two light beams, each having said predetermined wavelength and being linearly polarized in directions intersecting with each other at a normal angle; and a phase converting element receiving the two light beams linearly polarized in directions intersecting with each other at a normal angle from said splitting means, for converting the phase of the linearly polarized waves of each of the two light beams linearly polarized in directions intersecting with each other at normal angle for producing said two light beams that are circularly polarized in opposite rotational directions;

wherein said partially superimposing area forms an overlapping area that is linearly polarized.

4. A magneto-optical reproducing system as defined in claim 3, wherein said overlapping area is smaller than a cross-sectional size of either of the two light beams split by said light beam splitting means.

* * * * *

UNITED STATES PATENT AND TRADEMARK OFFICE
CERTIFICATE OF CORRECTION

PATENT NO. : 5,394,381
DATED : February 28, 1995
INVENTOR(S) : Atsushi Fukumoto and Michio Oka It is certified that error appears in the above-indentified patent and that said Letters Patent is hereby corrected as shown below:

```
Col. 1, line 17, delete "a"
        line 21, change "signal s" to --signals--
        line 31, change "f tom" to --from--
        line 54, change "-on" to --on--
Col. 3, line 8, delete "on"
        line 12, after "differently" delete ","
Col. 4, line 39, change "b₅converted" to --b₅ converted--
        line 45, change "order" to --other--
        line 55, after "and" insert --a--
Col. 5, line 36, change "b_B" to --b₆--
        line 51, change "rain" to --min--
        line 60, change "rain" to --min--
```

<u>In the Claims:</u>

Col. 9, line 9, after "element" insert --,--

Signed and Sealed this

Second Day of January, 1996

Attest:

BRUCE LEHMAN

*Attesting Officer*   Commissioner of Patents and Trademarks